US005642148A

United States Patent [19]

Fukushima et al.

[11] Patent Number: 5,642,148

[45] Date of Patent: Jun. 24, 1997

[54] THERMAL HEAD APPARATUS WITH INTEGRATED CIRCUITS AND CURRENT DETECTION

[75] Inventors: Itaru Fukushima, Tokyo; Takashi Okamoto, Fukui, both of Japan

[73] Assignees: NEC Corporation, Tokyo; Susumu Co., Ltd., Fukui, both of Japan

[21] Appl. No.: 350,055

[22] Filed: Nov. 29, 1994

[30] Foreign Application Priority Data

Nov. 30, 1993 [JP] Japan .................................... 5-326339

[51] Int. Cl.$^{6}$ .............................. B41J 2/35; G01D 15/10

[52] U.S. Cl. .............................................................. 347/211

[58] Field of Search .................................... 347/133, 191, 347/209, 210, 211, 236, 237

[56] References Cited

U.S. PATENT DOCUMENTS

| | | | |
|---|---|---|---|
| 4,500,893 | 2/1985 | Sakura et al. | 347/211 |
| 4,689,694 | 8/1987 | Yoshida | 347/237 |
| 5,132,709 | 7/1992 | West | 347/191 |
| 5,422,662 | 6/1995 | Fukushima et al. | 347/211 |

FOREIGN PATENT DOCUMENTS 0562626 9/1993 European Pat. Off. .

OTHER PUBLICATIONS

Patent Abstracts of Japan, vol. 15, No. 77, JP-A-02-299865.

Patent Abstracts of Japan, vol. 16, No. 157, JP-A-04 008562.

Patent Abstracts of Japan, vol. 18, No. 422, JP-A-06 127005.

Patent Abstracts of Japan, vol. 18, No. 554, JP-A-06 198943.

*Primary Examiner*—Mark J. Reinhart
*Assistant Examiner*—L. Anderson
*Attorney, Agent, or Firm*—Sughrue, Mion, Zinn, Macpeak & Seas

[57] ABSTRACT

A thermal head apparatus includes a heat generation driving integrated circuit and a current detecting integrated circuit. The heat generation driving integrated circuit is constituted by a plurality of first switching elements respectively connected in series with current detecting resistors, a first shift register for serially inputting print input data for heating heat generation elements, a first latch circuit for latching the print input data input to the first shift register at a predetermined timing, and a first output gate circuit for selectively controlling energization of the first switching elements on the basis of the print input data latched by the first latch circuit. The current detecting integrated circuit is constituted by a plurality of second switching elements respectively connected to connection points between the heat generation elements and the current detecting resistors, a second shift register, a second latch circuit, and a second output gate circuit for selectively controlling energization of the second switching elements on the basis of the data latched by the second latch circuit, the current detecting integrated circuit outputting, as serial data, current detection data which energizes the second switching elements.

8 Claims, 6 Drawing Sheets

THERMAL HEAD APPARATUS WITH INTEGRATED CIRCUITS AND CURRENT DETECTION

BACKGROUND OF THE INVENTION

The present invention relates to a thermal head apparatus used in a thermal printer and, more particularly, to a compact, low-cost thermal head apparatus.

A thermal printer has a simple mechanism, and a thermal printer having a large number of heat generation elements serving as recording elements can be easily manufactured. For this reason, the thermal printer is popularly used. In the thermal printer, a thermal head apparatus constituted by heat generation elements and a driving circuit therefor is arranged.

FIG. 5 shows a conventional thermal head apparatus. This thermal head apparatus is constituted by 64 heat generation elements R1 to R64 and a heat generation driving integrated circuit 80, and the heat generation elements R1 to R64 and the heat generation driving integrated circuit 80 are formed on a single thermal head base 81. The heat generation driving integrated circuit 80 is constituted by a shift register unit 801, a latch unit 802, an output gate unit 803, and 64 output transistors Q1 to Q64, and each of the shift register unit 801, the latch unit 802, and the output gate unit 803 has output terminals corresponding to 64 bits. The heat generation driving integrated circuit 80 is arranged as described above to reduce the number of wiring lines between the thermal head apparatus and an external control circuit. In addition, the thermal head base 81 is constituted by, e.g., an alumina ceramic board or the like.

Print data is input as 1-line serial data (Serial-in) but not as 64-bit parallel data to the shift register unit 801 synchronized with a clock signal Clock. The print data is transmitted to the latch unit 802 at the timing of a latch signal (Latch). Only while a strobe signal (Strobe) is set at L level, the output gate unit 803 turns on each output transistor, of the output transistors Q1 to Q64, corresponding to each heat generation element, of the heat generation elements R1 to R64, which receives an H-level output from the latch unit 802. For this reason, the heat generation elements R1 to R64 are driven in correspondence with H-level print data. In this manner, a thermal head apparatus having several hundred to several thousand heat generation elements is arranged such that the number of wiring lines between the thermal head apparatus and an external circuit is considerably small.

However, in this conventional thermal head apparatus, a problem on print quality is posed. That is, low-density printing is performed immediately after printing is started, and, as the printing progresses, high-density printing is performed. This problem is posed because heat for performing printing is stored in the base near the heat generation elements R1 to R64 or the overall thermal head apparatus.

In order to reduce influence of the heat storage, various heat storage correcting methods, i.e., circuits for controlling energy applied to perform printing in accordance with the temperature of a thermal head apparatus are proposed. For example, a method of controlling energy applied to heat generation elements on the basis of the information of a temperature sensor such as a thermistor arranged near heat generation elements to make a printing density uniform is proposed. However, according to this method, the thermal path between each heat generation element and the temperature sensor is long, and the heat response time of the temperature sensor itself is long. Therefore, sufficient heat storage correction cannot be performed.

In addition, a correction method based on printing hysteresis information is also proposed. This method controls energy applied to each heat generation element in accordance with the printing hysteresis of each heat generation element. In this case, since the method is based on print information supplied to each heat generation element itself, energy applied to each heat generation element can be controlled at an accuracy considerably higher than that of the above method using the temperature sensor. When the energy applied to each heat generation element can be controlled by relatively short printing hysteresis information, e.g., when printing such as character printing having a low printing ratio is performed, satisfactory print quality can be obtained.

However, at present, a thermal print scheme is applied to graphic printing. For this reason, in order to obtain good print quality using the above method, long-time hysteresis must be referred to, and print information of the method of arranging the heat generation elements must also be referred to. Therefore, a very large number of integrated circuits are required to practically use the method. In addition, when an image is to be printed, density gradation is required for each color generation dot. For this reason, a conventional print control scheme cannot sufficiently cope with printing of an image.

As a method of solving the above problem, the following method is proposed. That is, a material having an electrical resistance which is largely dependent on temperature is used as a heat generation element, the temperature of the heat generation element is measured on the basis of a change in electrical resistance, and energy applied to the heat generation element is controlled on the basis of the temperature information, thereby preferably performing printing. This method is shown in FIG. 6.

FIG. 6 shows another conventional thermal head apparatus. The same reference numerals as in FIG. 5 denote the same parts in FIG. 6, and a description thereof will be omitted. This thermal head apparatus is constituted by a thermal head base 82 having heat generation elements R1 to R64 formed thereon, a heat generation driving integrated circuit 80, current detecting resistors r1 to r64 each using a single register, a current detection circuit 84, and a control circuit 86 for controlling the elements, the circuits, and the resistors.

The basic difference between the thermal head apparatus in FIG. 6 and the thermal head apparatus shown in FIG. 5 is that the heat generation driving integrated circuit 80 and the like are externally arranged not to be mounted on the thermal head base 82 in FIG. 6. For this reason, a wiring cable having several hundreds to several thousands wiring lines is required between the heat generation driving integrated circuit 80 and the thermal head base 82 and the like. In this manner, the thermal head apparatus shown in FIG. 6 disadvantageously requires a wiring cable having a very large number of wiring lines.

More specifically, the volume of the current detecting resistors r1 to r64 is considerably larger than that of the heat generation elements R1 to R64. For this reason, when the current detecting resistors r1 to r64 are mounted on the thermal head base 82, the thermal head apparatus increases in size. In addition, expensive switching circuits which are equal in number to the heat generation elements R1 to R64, i.e., the current detecting resistors r1 to r64, and used in the current detection circuit 84 are required. When these switching circuits are mounted on the thermal head base 82, not only the thermal head apparatus increases in size, but also the overall thermal head apparatus increases in cost.

SUMMARY OF THE INVENTION

It is an object of the present invention to provide a thermal head apparatus in which circuits for detecting changes in electrical resistances of heat generation elements caused by a change in temperature are simply arranged on a board, constituting the thermal head apparatus to decrease the number of wiring cables or the like, thereby decreasing the size of an overall thermal printer including the thermal head apparatus and an external control circuit compared with a conventional thermal printer.

It is another object of the present invention to provide a thermal head apparatus capable of commonly using integrated circuits to reduce the cost.

In order to achieve the above objects, according to the present invention, there is provided a thermal head apparatus comprising a plurality of heat generation elements arranged in a line on a thermal head base and each having one common electrically connected terminal, a plurality of current detecting resistors respectively connected in series with the heat generation elements, a heat generation driving integrated circuit constituted by a plurality of first switching elements respectively connected in series with the current detecting resistors, a first shift register for serially inputting print input data for heating the heat generation elements, a first latch circuit for latching the print input data input to the first shift register at a predetermined timing, and a first output gate circuit for selectively controlling energization of the first switching elements on the basis of the print input data latched by the first latch circuit, and a current detecting integrated circuit constituted by a plurality of second switching elements respectively connected to connection points between the heat generation elements and the current detecting resistors, a second shift register for inputting serial data for detecting currents flowing in the heat generation elements, a second latch circuit for latching the data input to the second shift register at a predetermined timing, and a second output gate circuit for selectively controlling energization of the second switching elements on the basis of the data latched by the second latch circuit, the current detecting integrated circuit outputting, as serial data, current detection data which energizes the second switching elements.

DESCRIPTION OF THE PREFERRED EMBODIMENT

Figure 1:
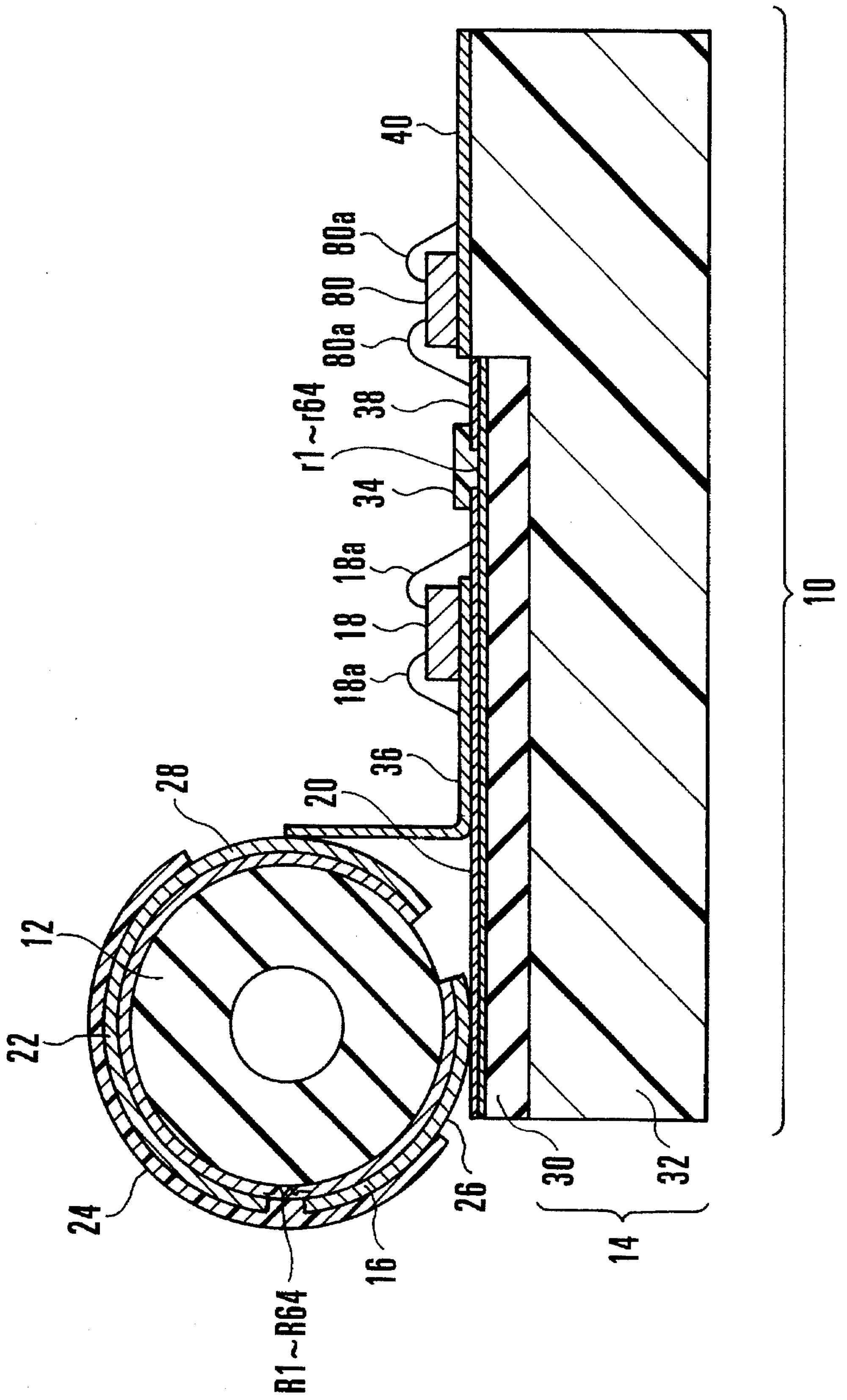
FIG. 1 is a sectional view showing the structure of a thermal head apparatus according to an embodiment of the present invention.
Figure 5:
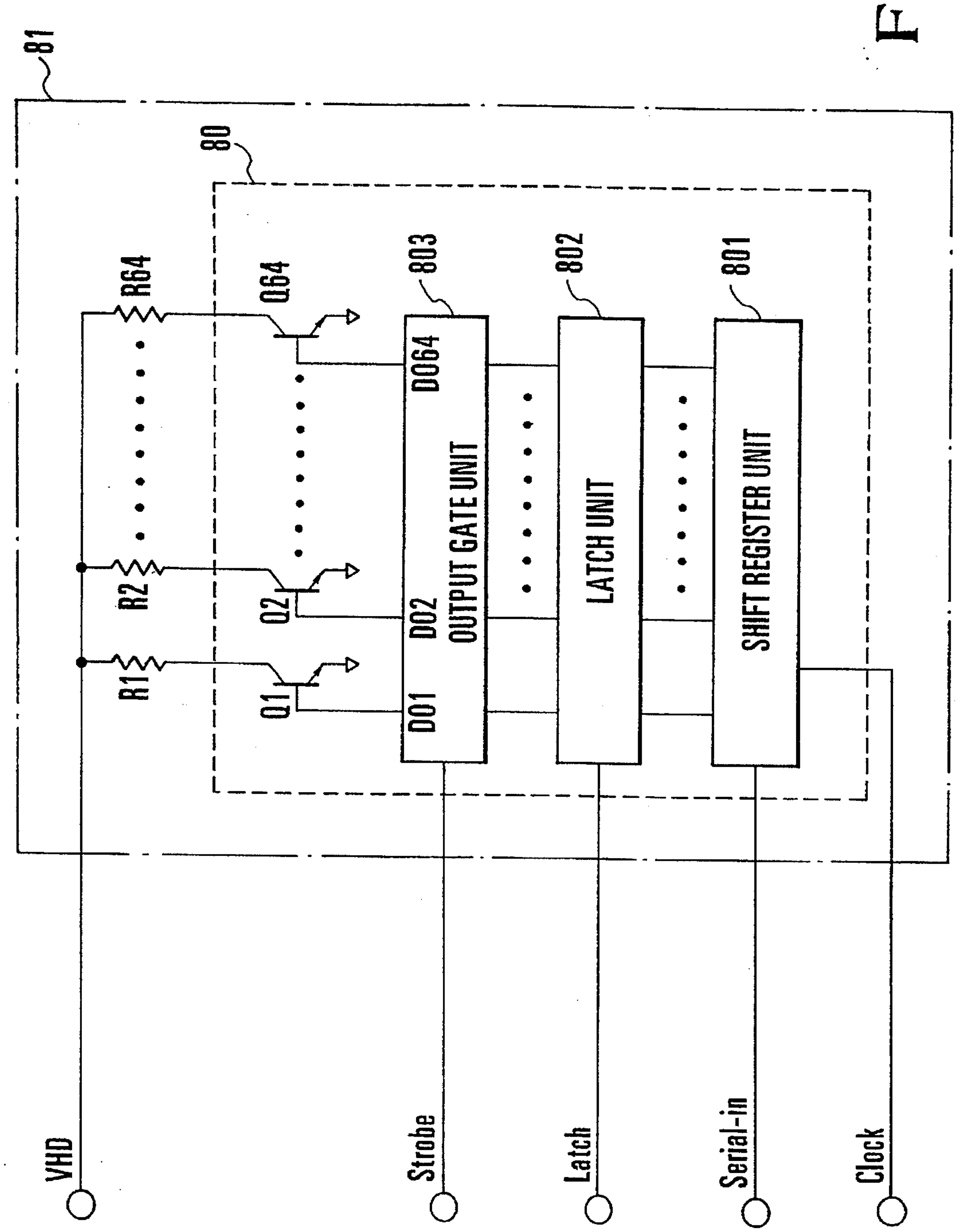
FIG.5 PRIOR ART
FIG. 5 is a circuit diagram showing a conventional thermal head apparatus.
Figure 6:
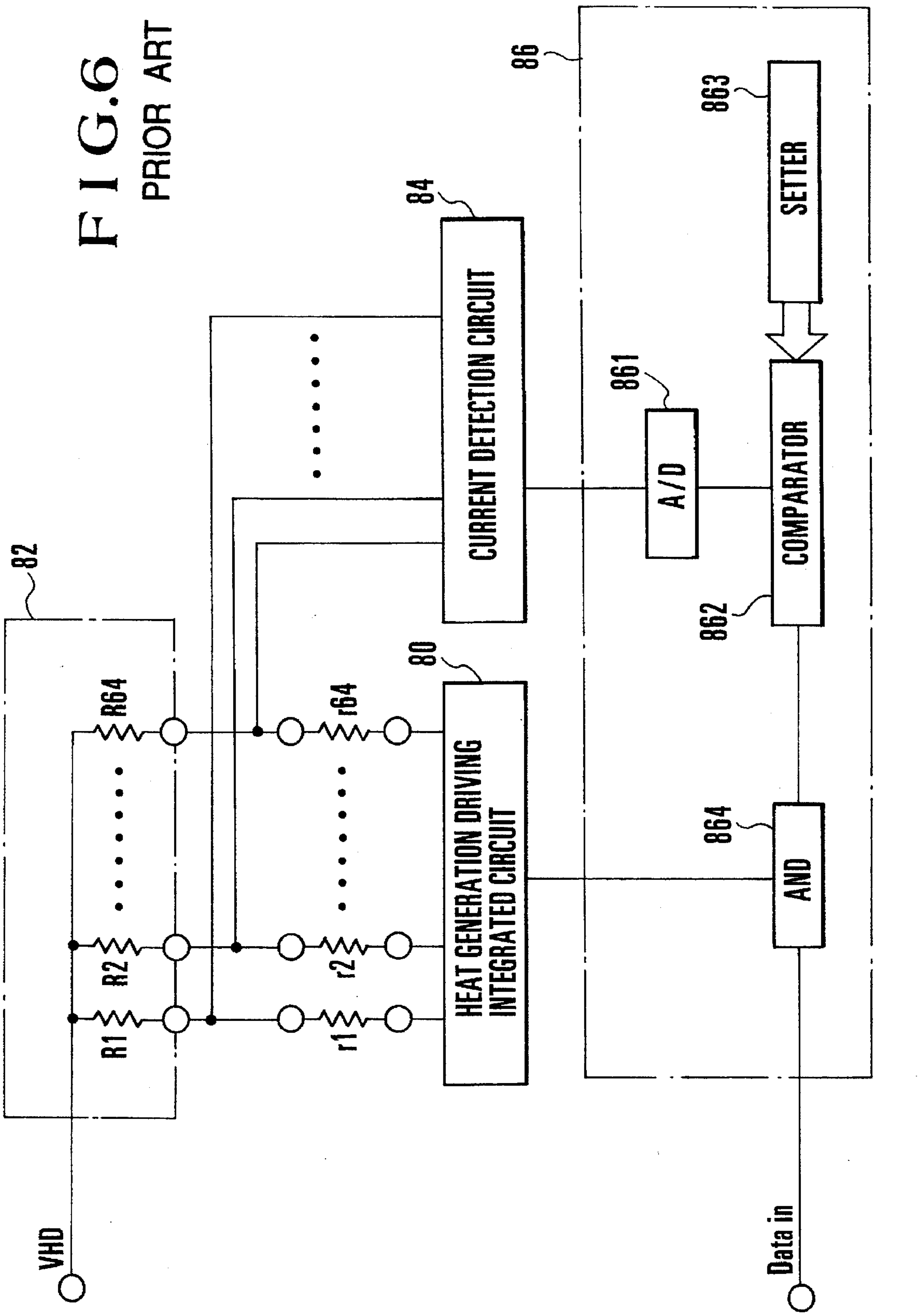
FIG.6 PRIOR ART
FIG. 6 is a block diagram showing another conventional thermal head apparatus.

FIG. 1 shows a thermal head apparatus according to an embodiment of the present invention. This embodiment will be described below with reference to FIG. 1. The same reference numerals as in FIG. 5 denote the same parts in FIG. 1, and a description thereof will be omitted.

A thermal head apparatus 10 according to the present invention is constituted by a thermal head base 12 and a mounting board 14. The thermal head base 12 is equipped with a larger number of heat generation elements R1 to R64 parallelly arranged in a line and thermal head base terminals 16 respectively connected to the heat generation elements R1 to R64. The mounting board 14 is equipped with current detecting resistors r1 to r64, respectively connected in series with the heat generation elements R1 to R64 through which currents equal to currents flowing in the corresponding heat generation elements R1 to R64 flow, a current detecting integrated circuit 18 for respectively detecting currents I1 to I64 respectively flowing into the heat generation elements R1 to R64 by the voltage drops of the current detecting resistors r1 to r64, a heat generation driving integrated circuit 80 for driving the heat generation elements R1 to R64 on the basis of print data, and mounting board terminals 20 arranged at the same interval as that of the thermal head base terminals 16 and respectively connected to the current detecting resistors r1 to r64 or the like. The mounting board terminals 20 are directly connected to the thermal head base terminals 16 by soldering, respectively. In addition, the heat generation driving integrated circuit 80 and the current detecting integrated circuit 18 respectively comprise integrated circuits whose arrangements are identical to each other.

The thermal head base 12 is formed by molding a material such as alumina ceramics into a cylindrical shape. The plurality of heat generation elements R1 to R64 are parallelly arranged in a line along the axis of the outer surface of the thermal head base 12. The thermal head base terminals 16 are respectively arranged on the circumferential extension lines of the heat generation elements R1 to R64 in correspondence with the heat generation elements R1 to R64. In addition, a common electrode 22 to which all the heat generation elements R1 to R64 are connected at once is arranged on the outer surface of the thermal head base 12 on the side opposing the thermal head base terminals 16. All the heat generation elements R1 to R64 and almost all of the thermal head base terminals 16 and the common electrode 22 are covered with a protective film 24 to protect them. The uncovered portion of the thermal head base terminals 16 and the common electrode 22 has a surface covered with the solder platings 26 and 28.

The mounting board 14 is constituted by an insulating board 30 consisting of, e.g., alumina ceramics or the like, and a holding plate 32 consisting of, e.g., a synthetic resin or the like. The mounting board terminals 20 constituted by thin films plated with gold are arranged on the surface of the insulating board 30 at the same pitch as that of the thermal head base terminals 16. The number of mounting board terminals 20 is equal to the number of the thermal head base terminals 16. The current detecting resistors r1 to r64 are arranged on the surface of the insulating board 30 on the extension lines of the mounting board terminals 20, and the surfaces of the current detecting resistors r1 to r64 are covered with a protective film 34. In addition, a flexible cable 36 adheres to the mounting board terminals 20. The current detecting integrated circuit 18 is mounted on the flexible cable 36, connected to the mounting board terminals 20 through gold wires 18*a*, and also connected to the flexible cable 36 through other gold wires 18*a*. On the other hand, the heat generation driving integrated circuit 80 is connected, through gold wires 80*a*, to wiring electrodes 38 connected to the current detecting resistors r1 to r64, and the heat generation driving integrated circuit 80 is connected to a flexible cable 40 through other gold wires 80*a*. The insulating board 30 and the flexible cable 40 are fixed on the holding plate 32.

The heat generation elements R1 to R64 are constituted by chromium-aluminum-based alloy thin films consisting of a material having a large temperature coefficient of a resistance. In this case, the resistance is set to be about 1 kΩ. In contrast to this, the current detecting resistors r1 to r64 are constituted by nickel-chromium-based alloy thin films consisting of a material having a small temperature coefficient of a resistance. In this case, the resistance is set to be about 10 Ω. After the heat generation elements R1 to R64 and the current detecting resistors r1 to r64 are formed independently of each other, the thermal head base terminals 16 on the thermal head base 12 are connected to the mounting board terminals 20 on the insulating board 30 by soldering, respectively. At the same time, the common electrode 22 on the thermal head base 12 is connected to the flexible cable 36 on the insulating board 30 by soldering. In addition, the heat generation elements R1 to R64 and the current detecting resistors r1 to r64 each having a temperature coefficient of a resistance different from that of each of the heat generation elements R1 to R64 are formed independently of each other, management in the steps in manufacturing the apparatus can be easily performed.

Figure 2:
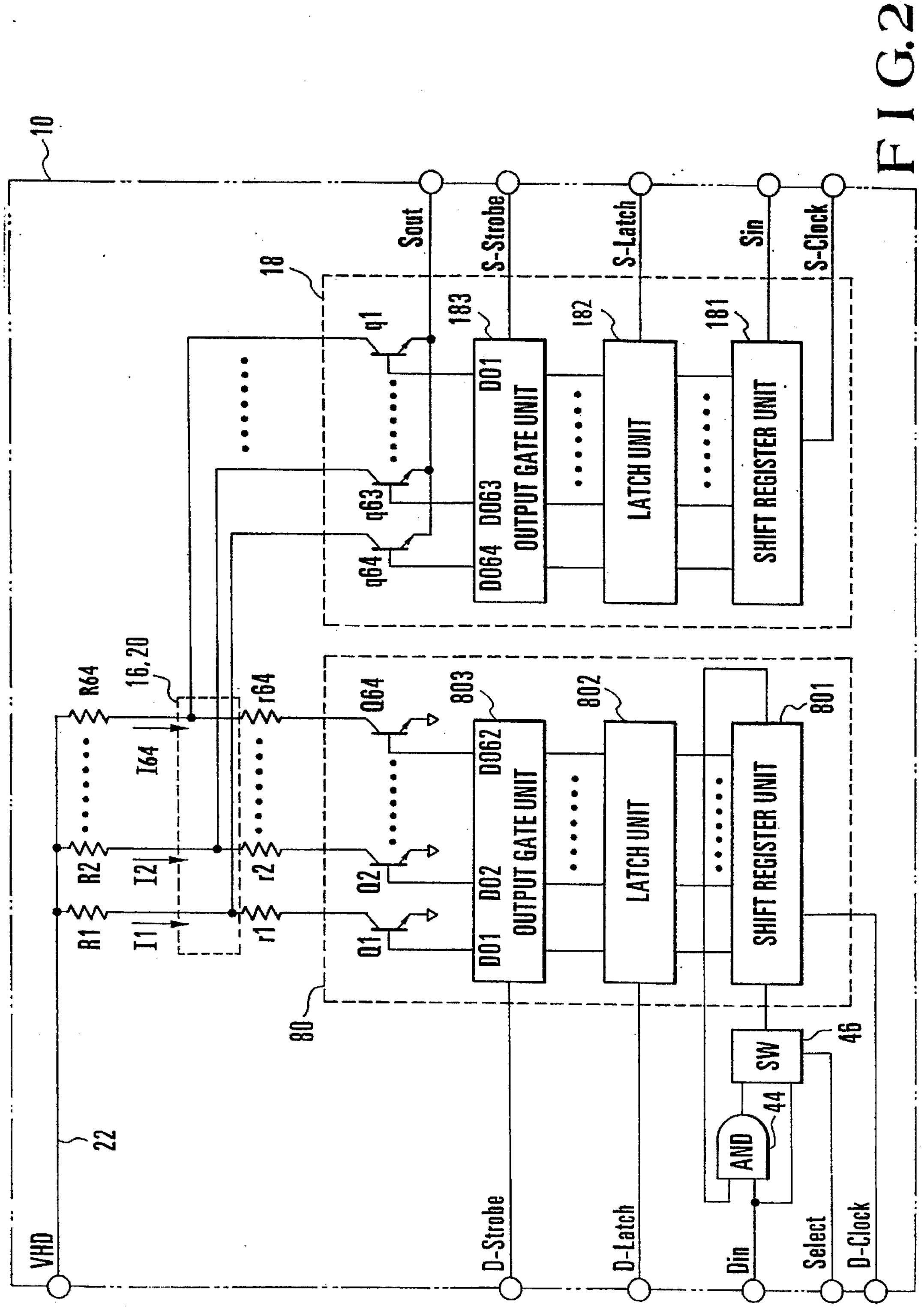
FIG. 2 is a circuit diagram showing the arrangement of the thermal head apparatus according to the embodiment of the present invention.
Figure 3:
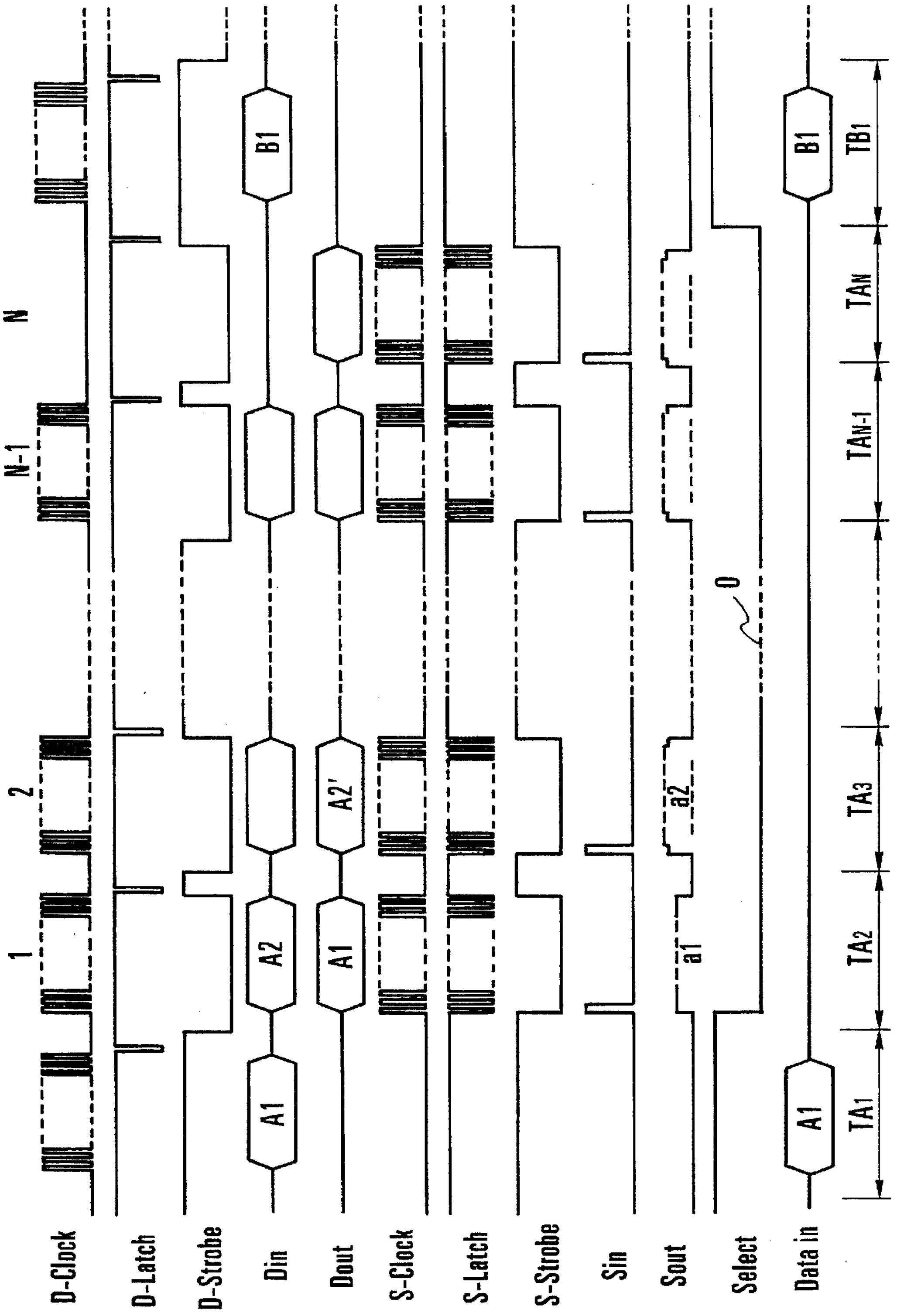
FIG. 3 is a timing chart showing the operation of the thermal head apparatus according to the embodiment of the present invention.
Figure 4:
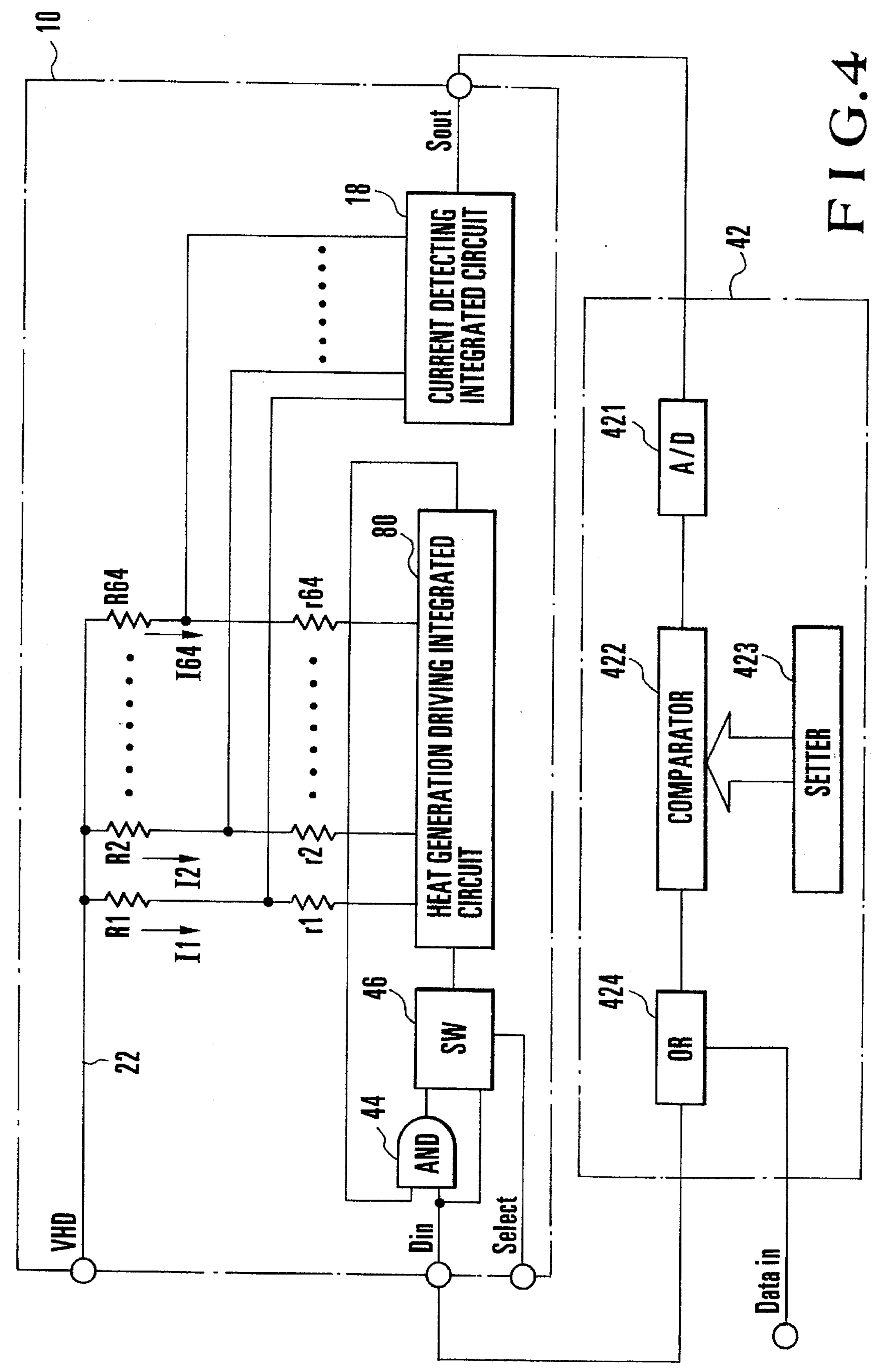
FIG. 4 is a block diagram showing the thermal head apparatus according to the embodiment of the present invention and an external control circuit.

FIG. 2 shows the circuit of the thermal head apparatus shown in FIG. 1, FIG. 3 shows the operation of the thermal head apparatus in FIG. 1, and FIG. 4 shows the thermal head apparatus in FIG. 1 and an external control circuit thereof. The same reference numerals as in FIG. 5 denote the same parts in FIGS. 2 to 4, and a description thereof will be omitted.

One terminal of each of all the heat generation elements R1 to R64 is connected to the common electrode 22, and a DC power supply voltage VHD for driving the thermal head apparatus is applied to the common electrode 22. The other terminal of each of the heat generation elements R1 to R64 is connected, through a corresponding one of the current detecting resistors r1 to r64, to the heat generation driving integrated circuit 80 constituted by a shift register unit 801, a latch unit 802, an output gate unit 803, and output transistors Q1 to Q64. Print input data Din is input to the shift register unit 801 with a sync signal D-Clock in the form of a serial signal, and the print input data Din and the sync signal D-Clock are transferred to the latch unit 802 at once at the timing of a latch signal D-Latch. The output gate unit 803 sets the output transistors Q1 to Q64 in an ON state on the basis of the print data transferred to the latch unit 802 for a time in which a strobe signal D-Strobe is set at L-level to flow currents into the heat generation elements R1 to R64, thereby causing the heat generation elements R1 to R64 to generate heat.

At this time, the currents I1 to I64 flowing in the heat generation elements R1 to R64 are almost determined by the applied voltage VHD and the resistances of the heat generation elements R1 to R64. In addition, since the resistances of the heat generation elements R1 to R64 are largely changed by temperature, the currents flowing in the heat generation elements R1 to R64 largely change due to heat generation during printing. More specifically, the currents I1 to I64 are correlated with the temperatures of the heat generation elements R1 to R64, and the temperatures of the heat generation elements R1 to R64 can be detected by the values of the currents I1 to I64. In addition, each of the currents I1 to I64 is proportional to a voltage across a corresponding one of the current detecting resistors r1 to r64. Therefore, the voltages are externally output through the current detecting integrated circuit 18 by a serial signal Sout externally input to the thermal head apparatus 10.

Although the heat generation driving integrated circuit 80 which is commercially available can be used as the current detecting integrated circuit 18, any integrated circuit cannot always be used as the current detecting integrated circuit 18. More specifically, the heat generation driving integrated circuit 80 in which the ground lines (emitter circuits) of the output transistors Q1 to Q64 are electrically insulated from the ground lines of other circuits, or diodes are inserted between the ground lines of the output transistors Q1 to Q64 and the ground lines of the other circuits in a direction reverse to the direction from the output transistors Q1 to Q64 to the other circuits, and the ground lines of the output transistors Q1 to Q64 and the terminals of the other circuits are arranged as independent terminals can be used as the current detecting integrated circuit 18.

In a serial input Sin to the current detecting integrated circuit 18, only one start bit has data, and the remaining bits are set at L level and input to the shift register unit 181 together with a clock signal S-Clock. The input 1-bit data is transferred to a latch unit 182 at the timing of a latch signal S-Latch. However, the clock signal S-Clock has a period equal to that of the latch signal S-Latch, and the timing of the latch signal S-Latch is delayed from the timing of the clock signal S-Clock. For this reason, when the serial signal Sin is shifted, the 1-bit data is shifted from the current detecting resistor r1 to the current detecting resistor r64 and output to a serial output terminal Sout.

Signals corresponding to the currents I1 to I64 correlated with the temperatures of the heat generation elements R1 to R64 are output from the terminal Sout, and transferred to a control circuit 42 (shown in FIG. 4) arranged outside the thermal head apparatus 10, and sequentially converted into digital amounts by an A/D converter 421. Thereafter, a comparator 422 compares the digital amounts with a temperature set in a setter 423. When a digital amount does not reach the set temperature, an H-level signal is fed back to a serial input terminal Din of the thermal head apparatus 10; when a digital amount reaches the set temperature, an L-level signal is fed back to the serial input terminal Din of the thermal head apparatus 10. The above series of operations are performed at each period of each of the clock signals D-Clock and S-Clock to the heat generation driving integrated circuit 80 and the current detecting integrated circuit 18.

The clock signal of the shift register unit 801 of the heat generation driving integrated circuit 80 is synchronized with the clock signal of the shift register unit 181 of the current detecting integrated circuit 18, the output terminals of the output transistors Q1 to Q64 of the heat generation driving integrated circuit 80 connected to the current detecting resistors r1 to r64 are respectively connected to the output terminals of output transistors q64 to q1 such that the connection order of the output transistors Q1 to Q64 is reverse to the connection order of the output transistors q1 to q64. For this reason, a signal output from the terminal Sout of the current detecting integrated circuit 18 has a timing and an arrangement order of data which are equal to those of print data to be controlled.

At each printing period, printing energy is applied to the heat generation elements R1 to R64 a plurality of times. At this moment, the temperatures of the heat generation elements R1 to R64 are detected. No more printing energy is applied to a heat generation element, of the heat generation elements R1 to R64, whose temperature reaches the set temperature. At this time, although first sub-print data "Data in" of each printing period is transferred from the control circuit 42, data cyclically transferred from the shift register unit 801 are used as second or subsequent print data. This data switching is performed by a switch 46 using a selection signal Select. At this time, a comparator signal from the comparator 422 is input to the serial input terminal, and only a heat generation element, of the heat generation elements R1 to R64, whose temperature does not reach the predetermined temperature, is set at H level. In the AND gate 44, the logical product between the sub-print data and an output from the shift register unit 801 is calculated. The shift register unit 801 goes to H level in correspondence with the heat generation element, of the heat generation elements R1 to R64, whose temperature does not reach the predetermined temperature, and energy is applied to the heat generation element whose temperature does not reach the predetermined temperature. On the other hand, the shift register unit 801 goes to L level in correspondence with a heat generation element, of the heat generation elements R1 to R64, whose temperature reaches the predetermined temperature, and no more energy is applied to the heat generation element, of the heat generation elements R1 to R64, whose temperature reaches the predetermined temperature.

According to this embodiment, the terminals of the output transistors Q1 to Q64 of the heat generation driving integrated circuit 80 and the output transistors q1 to q64 of the current detecting integrated circuit 18 are respectively connected such that the connection order of the output transistors Q1 to Q64 is reverse to the connection order of the output transistors q1 to q64. For this reason, a control signal from the current detecting integrated circuit 18 can be used as serial data for printing, and a process for print data is considerably simplified, and the print data can be processed at a high speed. Therefore, the present invention can cope with a high-speed printing operation having density gradation.

In monochrome halftone printing, print data corresponding to pixels of one line is stored in the setter 423. If one pixel is represented by 8 bits, one-line print data of 256 gradation levels is stored in the setter 423. This print data is also used as set temperature data for causing printing paper to generate a color by each of the heat generation elements R1 to R64.

"Data in" is H-level sub-print data of one line with respect to a dot to be printed, and is L-level sub-print data of one line with respect to a dot not to be printed.

The operation of data will be described below in detail with reference to the timing chart of FIG. 3. The sub-print data "Data in" is input to an OR gate 424 only when a select signal Select is set at H level. That is, at only a data receiving period at the initial timing of printing for each line, the sub-print data "Data in" of the corresponding line is input to the 0R gate 424. In other periods, the sub-print data "Data in" is not input.

In this embodiment, when 1-line printing is to be performed, a clock signal D-Clock repeatedly generates N clocks for one line and repeatedly drives the heat generation elements R1 to R64 up to completion of the 1-line printing to gradually increase the temperatures of the heat generation elements R1 to R64. The clock signal D-Clock stops the heat generation element of a pixel whose temperature reaches a set temperature, so that recording can be performed at an optimum density for each of the heat generation elements R1 to R64.

When the print data of data A1 of the first line is stored in the setter 423, the sub-print data "Data in" of the data A1 is input to the OR gate 424 in a period TA1. While the sub-print data is input, the comparator 422 always outputs "0" even when the A/D converter 421 outputs any data. The switch 46 selects the input signal of a terminal Din because the select signal Select is set at H level. Therefore, the sub-print data "Data in" is directly input to the shift register unit 801 of the heat generation driving integrated circuit 80. Immediately after the sub-print data "Data in" is input, an output from the shift register unit 801 is latched by the latch unit 802, and the heat generation elements R1 to R64 are driven in accordance with the sub-print data "Data in".

A heat generation element having H-level sub-print data "Data in" is energized and heated because a corresponding one of the output transistors Q1 to Q64 is turned on. A heat generation element having L-level sub-print data "Data in" is not energized or heated because a corresponding one of the output transistors Q1 to Q64 is set in an OFF state.

At the same time, the temperatures of the heat generation elements R1 to R64 are detected from the serial output terminal Sout of the current detecting integrated circuit 18, and this data string representing the temperatures is A/D-converted by the A/D converter 421 for the temperature data of each heat generation element. For example, when each of the clock rates of the clock signal D-Clock and the clock signal S-Clock (substantially equal to the clock signal D-Clock) is set to be 4 MHz, the data rate of the serial output Sout is 4 MHz, and the rate of A/D conversion is 100 MHz which is higher than the data rate of the serial output Sout. An output from the A/D converter 421 is compared by the comparator 422 with print data set by the setter 423 for each of the heat generation elements R1 to R64. Note that, in the serial output Sout, al denotes temperature detection data "Data in" obtained when the data A1 is output, and reference numeral a2 denotes temperature detection data "Data in" obtained when the data A2 is output.

As a comparison result, when the temperature data is smaller than the set value, an H-level output is output; and when the temperature data is larger than the set value, an L-level output is output. When this output is input to the OR gate 424, the sub-print data "Data in" is set to be "0" in periods TA2 to TAN serving as a printing period. For this reason, an output from the comparator 422 is directly input to an AND gate 44 as input data Din. At the same time, the sub-print data of the data A1 shifted to the right from the shift register unit 801 is input to the AND gate 44.

When the input data Din is a comparison result with respect to the temperature detection data of the heat generation element R1, the data shifted to the right from the shift register unit 801 is data for driving the heat generation element R1, and data associated with the same heat generation element is input to the AND gate 44. An output from the AND gate 44 is stored in the shift register unit 801 again through the switch 46. At this time, assuming that all outputs from the comparator 422 are set at H level, the storage contents of the shift register unit 801 become equal to those of the data A1 which has been stored in the shift register unit 801. With respect to a heat generation element, of the heat generation elements R1 to R64, which causes the comparator 422 to output an L-level output, the storage contents of the shift register unit 801 go to L level ("0"). More specifically, driving of the heat generating element heated to the set temperature is stopped by setting the output from the comparator 422 at L level and writing the L-level output in the shift register unit 801, thereby stopping heating of the heat generation element.

The operations described above are repeated until 1-line clock signal D-Clock is supplied N times.

This number N is determined to be a value such that printing of a pixel having the highest density is finished until the clock signal D-Clock is input N times.

Upon completion of 1-line printing, data B1 of the next one line is stored in the setter 423, print data "Data in" of the data B1 is input in a period TB1. Subsequently, the same operations as described above are repeated.

Note that, when temperature data for performing printing having a predetermined black level is input to the setter 423, monochrome binary printing can be performed.

The present invention can be applied to not only monochrome printing but also color printing. When color printing is to be performed, printing is performed using three primary colors, i.e., yellow (Y), magenta (M), and cyan (C).

As printing paper, thermal paper obtained by sequentially forming a cyan generation layer, a magenta generation layer, and an yellow generation layer on base paper is used. The printing paper is white before it is not heated, as a matter of course. When the color generation layers are heated, the color generation layers generate colors at different temperatures, respectively. That is, the printing paper generates a color corresponding to a temperature at which the printing paper is heated. For example, assuming that the color generation temperatures of the Y, M, and C color generation layers are represented by A, B, and C, respectively, $A<B<C$ is satisfied.

Yellow is generated first and then fixed, and magenta is generated. In addition, after magenta is fixed, cyan is generated. When a color obtained by mixing yellow and magenta is to be generated by a pixel, yellow is generated and fixed on this pixel, and magenta is generated and fixed on the same pixel. Note that, when printing is to be performed using only magenta, after fixing is performed without generating yellow, magenta is generated.

When color thermal recording is to be performed using the above printing paper, 1-line temperature data representing the color generation temperatures of Y, M, and C is input to and stored in the setter 423 with respect to each pixel (heat generation element). This temperature data is color generation print data for causing each heat generation element to generate heat.

As the sub-print data "Data in", H-level 1-line data is input to a pixel which generates a color in correspondence with print data, L-level 1-line data is input to a pixel which generates no color. Operations following this operation are the same as those of monochrome halftone printing. In this manner, pixels can generate colors each having a density corresponding to a set temperature while the temperatures of heat generation elements are monitored, and color thermal recording can be performed using faithful colors within a short time.

In the thermal head apparatus according to the present invention, since the thermal head base equipped with the heat generation elements or the like is directly connected, by soldering, to the mounting board equipped with the heat generation driving integrated circuit or the like to integrate the thermal head base with the mounting board, the heat generation elements can be connected to the heat generation driving integrated circuit or the like without using wiring cables. Therefore, an overall thermal printer including the thermal head apparatus and an external control circuit can be decreased in size.

In addition, since integrated circuits whose arrangements are identical to each other can be used as the heat generation driving integrated circuit and the current detecting integrated circuits, respectively, a large number of integrated circuits of the same type can be used. For this reason, thermal head apparatuses can be produced at low cost. Since a large number of heat generation driving integrated circuits are generally used, the heat generation driving integrated circuits can be obtained at low cost. For this reason, the current detecting integrated circuit can be obtained at low cost. Therefore, a thermal head apparatus can be obtained at low cost.

What is claimed is:

1. A thermal head apparatus comprising:

a plurality of heat generation elements arranged in a line on a thermal head base and each having one common electrically connected terminal;

a plurality of current detecting resistors respectively connected in series with said heat generation elements;

a heat generation driving integrated circuit constituted by a plurality of first switching elements respectively connected in series with said current detecting resistors, a first shift register for serially inputting prim input data for heating said heat generation elements, a first latch circuit for latching the print input data input to said first shift register at a predetermined timing to provide latched print input data, and a first output gate circuit for selectively controlling energization of said first switching elements on a basis of said latched print input data; and a current detecting integrated circuit constituted by a plurality of second switching elements respectively connected to connection points between said heat generation elements and said current detecting resistors, a second shift register for inputting serial data for detecting currents flowing in said heat generation elements, a second latch circuit for latching the data input to said second shift register at a predetermined timing, and a second output gate circuit for selectively controlling energization of said second switching elements on the basis of the data latched by said second latch circuit;

said current detecting integrated circuit outputting, as serial data, current detection data which is provided, via a feedback circuit, to said heat generation driving integrated circuit to energize said first switching elements.

2. An apparatus according to claim 1, wherein said current detecting integrated circuit comprises an integrated circuit having an arrangement the same as that of said heat generation driving integrated circuit.

3. An apparatus according to claim 2, wherein, in said heat generation driving integrated circuit, ground lines of said first switching elements are electrically insulated from ground lines of other circuits, or diodes are respectively inserted between the ground lines of the first switching elements and the ground lines of the other circuits in a direction reverse to a direction from said first switching elements to the other circuits, and the ground lines of said first switching elements and the ground lines of the other circuits have independent terminals, respectively.

4. An apparatus according to claim 2, wherein said second shift register is operated in response to a clock having a period and phase which are equal to those of a clock of said first shift register.

5. An apparatus according to claim 4, wherein said first shift register comprises a feedback circuit for returning shifted output data to an input terminal, and the input data is cyclically transferred.

6. An apparatus according to claim 5, wherein said second switching elements are respectively connected to connection points between said heat generation elements and said current detecting resistors in an order reverse to a connection order of said first switching elements with respect to said heat generation elements.

7. An apparatus according to claim 6, further comprising a control circuit for comparing current detection data output from said current detecting integrated circuit with a set value to output data of a comparison result to said feedback circuit.

8. A thermal head apparatus, comprising:

an insulating thermal head base, and an insulating mounting board;

wherein:

(1) a plurality of heat generation elements arranged in a line, and (2) a plurality of thermal head base terminals respectively connected to said heat generation elements are formed on a surface of said thermal head base; and wherein:

(1) a plurality of current detecting resistors respectively corresponding to said heat generation elements, (2) a plurality of mounting board terminals arranged in a line at an interval equal to that of said thermal head base terminals, directly connected to said thermal head base terminals by soldering, and respectively connected to said current detecting resistors, (3) a heat generation driving integrated circuit for energizing said heat generation elements on the basis of print data to drive said heat generation elements to generate heat, and (4) a current detecting integrated circuit for detecting currents flowing in said heat generation elements on a basis of voltage drops caused by currents flowing in said current detecting resistors are formed on a surface of said mounting board.

* * * * *